United States Patent
Zhang et al.

(10) Patent No.: US 12,443,081 B2
(45) Date of Patent: Oct. 14, 2025

(54) ARRAY SUBSTRATE AND METHOD FOR MANUFACTURING SAME, DISPLAY PANEL, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yadong Zhang, Beijing (CN); Ting Li, Beijing (CN); Bo Wu, Beijing (CN); Xiongcan Zuo, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/686,877

(22) PCT Filed: Oct. 27, 2022

(86) PCT No.: PCT/CN2022/128057
§ 371 (c)(1),
(2) Date: Feb. 27, 2024

(87) PCT Pub. No.: WO2024/087117
PCT Pub. Date: May 2, 2024

(65) Prior Publication Data
US 2025/0130471 A1    Apr. 24, 2025

(51) Int. Cl.
*G09G 3/36* (2006.01)
*G02F 1/1362* (2006.01)
*G02F 1/1368* (2006.01)

(52) U.S. Cl.
CPC ...... *G02F 1/136286* (2013.01); *G02F 1/1368* (2013.01); *G09G 3/3674* (2013.01);
(Continued)

(58) Field of Classification Search
CPC .......................... G09G 3/3674; G09G 3/3677
See application file for complete search history.

(56) References Cited

U.S. PATENT DOCUMENTS

2014/0146025 A1* 5/2014 Shi ....................... G09G 3/3648
345/204
2016/0163778 A1  6/2016 Wang et al.
(Continued)

FOREIGN PATENT DOCUMENTS

CN         104360558 A      2/2015
CN         104934458 A      9/2015
(Continued)

*Primary Examiner* — Roy P Rabindranath
(74) *Attorney, Agent, or Firm* — XSENSUS LLP

(57) ABSTRACT

Provided is an array substrate, including a substrate. The substrate includes a display region and a peripheral region surrounding the display region. The display region includes a plurality of pixel regions arranged in arrays. The array substrate further includes a plurality of GOA units and a plurality of gate lines. The plurality of GOA units are arranged along a first direction. The peripheral region includes a data pad (DP) region and a data pad opposite (DPO) region that are arranged opposite to each other along a second direction on two sides of the display region. The plurality of GOA units are within the DPO region, the plurality of gate lines are within the display region, and the plurality of GOA units are electrically connected to the plurality of gate lines. The first direction is intersected with the second direction.

16 Claims, 8 Drawing Sheets

(52) U.S. Cl.
CPC ............ *G09G 2300/0408* (2013.01); *G09G 2300/0426* (2013.01)

(56) References Cited

U.S. PATENT DOCUMENTS

| | | |
|---|---|---|
| 2016/0379996 A1 | 12/2016 | Ma et al. |
| 2017/0031223 A1 | 2/2017 | Xue et al. |
| 2017/0069280 A1* | 3/2017 | Xu ............................ G09G 3/20 |
| 2017/0242311 A1* | 8/2017 | Li ...................... G02F 1/13306 |
| 2021/0012691 A1* | 1/2021 | Hu ....................... G09G 3/3677 |
| 2021/0183327 A1* | 6/2021 | Chen ........................ G09G 3/20 |
| 2022/0102389 A1 | 3/2022 | Wang et al. |
| 2022/0317530 A1 | 10/2022 | Huang et al. |
| 2023/0154427 A1* | 5/2023 | Wang ....................... G09G 3/20 |
| | | 345/87 |

FOREIGN PATENT DOCUMENTS

| | | |
|---|---|---|
| CN | 105652544 A | 6/2016 |
| CN | 106200162 A | 12/2016 |
| CN | 107093584 A | 8/2017 |
| CN | 111427206 A | 7/2020 |
| CN | 114280861 A | 4/2022 |

\* cited by examiner

ARRAY SUBSTRATE AND METHOD FOR MANUFACTURING SAME, DISPLAY PANEL, AND DISPLAY DEVICE

CROSS-REFERENCE TO RELATED APPLICATION

The present disclosure is a U.S. national stage of international application No. PCT/CN2022/128057, filed on Oct. 27, 2022, the content of which is herein incorporated by reference in its entirety.

TECHNICAL FIELD

The present disclosure relates to the field of display technologies, and in particular, relates to an array substrate and a method for manufacturing the same, a display panel, and a display device.

BACKGROUND

Bezel narrowing refers to the technology that increases a ratio of a display region and expands a screen-to-body ratio by reducing a dimension of a screen bezel. How to achieve a narrow bezel is a challenge in display panel design and manufacturing.

SUMMARY

Some embodiments of the present disclosure provide an array substrate and a method for manufacturing the same, a display panel, and a display device. The technical solutions are as follows.

According to some embodiments of the present disclosure, an array substrate is provided. The array substrate includes a substrate, wherein the substrate includes a display region and a peripheral region surrounding the display region, the display region including a plurality of pixel regions arranged in arrays; and the array substrate further includes a plurality of GOA units and a plurality of gate lines, wherein the plurality of GOA units are arranged along a first direction, the peripheral region includes a data pad (DP) region and a data pad opposite (DPO) region that are arranged opposite to each other along a second direction on two sides of the display region, the plurality of GOA units are within the DPO region, the plurality of gate lines are within the display region, and the plurality of GOA units are electrically connected to the plurality of gate lines, the first direction being intersected with the second direction.

In some embodiments, the plurality of gate lines include a plurality of first gate lines and a plurality of second gate lines, wherein an extension direction of the first gate line is consistent with the second direction, an extension direction of the second gate line is consistent with the first direction, and the plurality of second gate lines are connected to the plurality of GOA units respectively by the plurality of first gate lines.

In some embodiments, a number of the pixel regions in one row arranged along the first direction is greater than a number of the pixel regions in one column arranged along the second direction.

In some embodiments, the plurality of the first gate lines are within a middle section of the display region.

In some embodiments, one of the first gate lines is arranged in each column of the pixel regions in the middle section of the display region.

In some embodiments, the pixel region includes a first sub-region, a second sub-region, and a third sub-region that are arranged along the first direction, wherein the first sub-region is a green sub-region, and the first gate line is between the second sub-region and the third sub-region, or the first gate line is within the second sub-region or the third sub-region.

In some embodiments, the peripheral region further includes a connection region between the display region and the DPO region; and the array substrate further includes a plurality of connection lines in the connection region, the plurality of first gate lines being connected to the plurality of GOA units respectively by the plurality of connection lines.

In some embodiments, at least a portion of the connection lines are straight lines.

In some embodiments, in the connection region, the array substrate further includes a gate layer, a gate insulator layer, and a source-drain layer that are successively stacked on the substrate, and the plurality of connection lines include a plurality of first connection lines and a plurality of second connection lines; wherein the first connection line is disposed in the source-drain layer, the first connection line is directly connected to an output terminal of the GOA unit at a position, proximal to the DPO region, of the connection region, and the first connection line is directly connected to the first gate line at a position, proximal to the display region, of the connection region; and the second connection line is disposed in the gate layer, the second connection line is connected to the output terminal of the GOA unit through a via at the position, proximal to the DPO region, of the connection region, and the second connection line is connected to the first gate line through a via at the position, proximal to the display region, of the connection region.

In some embodiments, orthographic projections of the plurality of first connection lines on the substrate and orthographic projections of the plurality of second connection lines on the substrate are alternated with each other.

In some embodiments, in the connection region, the array substrate further includes a gate layer, a gate insulator layer, and a source-drain layer that are successively stacked on the substrate; and the connection line is disposed in the source-drain layer, the connection line is directly connected to an output terminal of the GOA unit at a position, proximal to the DPO region, of the connection region, and the connection line is directly connected to the first gate line at a position, proximal to the display region, of the connection region.

In some embodiments, in the connection region, the array substrate further includes a gate layer disposed on the substrate; and the connection line is disposed in the gate layer, the connection line is connected to an output terminal of the GOA unit through a via at a position, proximal to the DPO region, of the connection region, and the connection line is connected to the first gate line through a via at a position, proximal to the display region, of the connection region.

In some embodiments, in the display region, the array substrate further includes a gate layer, a gate insulator layer, a source-drain layer, a protection layer, and a common electrode layer that are successively stacked on the substrate, the common electrode layer including a gate connection line; and the first gate line is disposed in the source-drain layer, the second gate line is disposed in the gate layer, the first gate line is connected to the gate connection line through a first via in the protection layer, and the second gate line is connected to the gate connection line through a second via in the gate insulator layer and the protection layer.

In some embodiments, the common electrode layer further includes a common electrode, wherein the common electrode includes a hollowed-out region, the gate connection line being within the hollowed-out region.

In some embodiments, a number of the pixel regions in one row arranged along the first direction is greater than or equal to twice a number of the pixel regions in one column arranged along the second direction, a number of the first gate lines is equal to twice a number of the second gate lines, a number of the GOA units is greater than or equal to twice the number of the pixel regions in one column, each of the second gate lines is connected to two GOA units by two first gate lines, and the two GOA units connected to the same second gate line are arranged symmetrically with respect to a centerline, the centerline being a centerline of the substrate extending along the second direction.

In some embodiments, boundaries of adjacent GOA units in the plurality of GOA units are coincident, and the GOA units disposed at two ends are respectively disposed on or near two sides of the display region in the first direction.

According to some embodiments of the present disclosure, a display panel is provided. The display panel includes the array substrate as described above.

According to some embodiments of the present disclosure, a display device is provided. The display device includes the display panel as described above.

According to some embodiments of the present disclosure, a method for manufacturing an array substrate is provided. The method includes: providing a substrate, wherein the substrate includes a display region and a peripheral region surrounding the display region, the display region including a plurality of pixel regions arranged in arrays; and forming a plurality of GOA units and a plurality of gate lines on the substrate, wherein the plurality of GOA units are arranged along a first direction, the peripheral region includes a data pad (DP) region and a data pad opposite (DPO) region that are arranged opposite to each other along a second direction on two sides of the display region, the GOA unit is within the DPO region, the plurality of gate lines are within the display region, and the plurality of GOA units are electrically connected to the plurality of gate lines, the first direction being intersected with the second direction.

In some embodiments, the plurality of gate lines include a plurality of first gate lines and a plurality of second gate lines, wherein an extension direction of the first gate line is consistent with the second direction, an extension direction of the second gate line is consistent with the first direction, and the plurality of second gate lines are connected to the plurality of GOA units respectively by the plurality of first gate lines; and the plurality of the first gate lines are within a middle section of the display region.

In some embodiments, forming the plurality of GOA units and the plurality of gate lines on the substrate includes: forming a gate layer on the substrate, wherein the gate layer includes the second gate line; depositing a gate insulator layer on the gate layer; forming a source-drain layer on the gate insulator layer, wherein the source-drain layer includes the first gate line; depositing a protection layer on the source-drain layer; forming a first via and a second via by processing the protection layer and the gate insulator layer by a patterning process, wherein the first via is disposed in the protection layer, and the second via is disposed in the protection layer and the gate insulator layer; and forming a common electrode layer on the protection layer, wherein the common electrode layer includes a gate connection line, the gate connection line being connected to the first gate line through the first via and connected to the second gate line through the second via.

In some embodiments, the common electrode layer further includes a common electrode, wherein the common electrode includes a hollowed-out region, the gate connection line being within the hollowed-out region.

In some embodiments, the peripheral region further includes a connection region between the display region and the DPO region; and the method further includes: forming a plurality of connection lines on the substrate in the connection region, wherein the plurality of first gate lines are connected to the plurality of GOA units respectively by the plurality of the connection lines.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

DETAILED DESCRIPTION

The present disclosure is described in further detail with reference to the accompanying drawings, to clearly present the objects, technical solutions, and advantages of the present disclosure.

Figure 1:
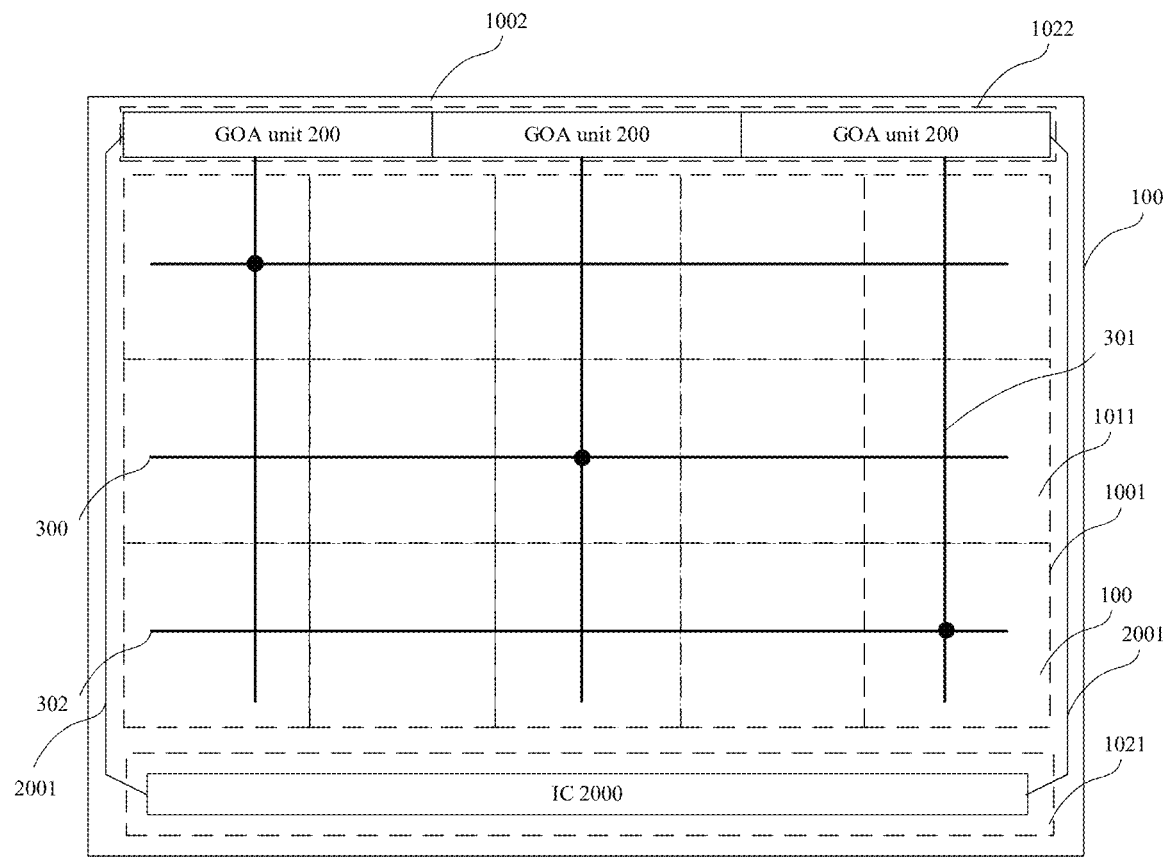
FIG. 1 is a schematic structural diagram of an array substrate according to some embodiments of the present disclosure.

FIG. 1 is a schematic structural diagram of an array substrate according to some embodiments of the present disclosure. Referring to FIG. 1, the array substrate includes a substrate 100. The substrate 100 has a display region 1001 and a peripheral region 1002 surrounding the display region 1001. The display region 1001 includes a plurality of pixel regions 1011 arranged in arrays.

The array substrate further includes a plurality of gate driver on array (GOA) units and a plurality of gate lines 300. The plurality of GOA units 200 are arranged along a first direction. The peripheral region 1002 includes a data pad (DP) region 1021 and a data pad opposite (DPO) region 1022 that are arranged opposite to each other along a second direction on two sides of the display region 1001. The plurality of GOA units 200 are within the DPO region 1022, the plurality of gate lines 300 are within the display region 1001, and the plurality of GOA units 200 are electrically connected to the plurality of gate lines 300.

The GOA unit 200 being electrically connected to the gate line 300 includes the GOA unit 200 being directly connected to the gate line 300 or the GOA unit 200 being connected to the gate line 300 by other conductive lines, such that electrical signals are transmitted between the GOA unit 200 and the gate line 300.

The first direction and the second direction are intersected. In some embodiments, the first direction is perpendicular to the second direction.

In some embodiments, the first direction is a direction in FIG. 1 from left to right, the second direction is a direction in FIG. 1 from top to bottom, and the first direction is perpendicular to the second direction. This is only one example, and in other embodiments, the first direction and the second direction are also other directions. In some embodiments, the first direction is a direction in FIG. 1 from top to bottom. 1 and the second direction is a direction in FIG. 1 from left to right.

The GOA unit 200 is a circuit unit formed by directly integrating a gate driver circuit of the display panel in the peripheral region 1002 of the array substrate 100. Each of the GOA units 200 is configured to supply gate driver signals for a row of pixels. The plurality of GOA units 200 are successively arranged along the first direction. For the GOA unit 200 to have a longer dimension in the first direction, typically, boundaries of adjacent GOA units 200 are provided to be coincident, and the GOA units 200 at both ends are disposed on or near two sides of the display region 1001 in the first direction. The term "near" means that a distance from the GOA unit 200 to one, which is closer to the GOA unit 200, of the two sides of the display region 1001 in the first direction is less than a threshold. In some embodiments, the threshold is a dimension of one pixel region in the first direction.

The dimension of the GOA unit 200 in the first direction herein refers to a maximum length in the first direction of a projection of the GOA unit on the substrate.

The DP region 1021 is a region of the array substrate configured to arrange pads connecting a flexible circuit board or a chip on film circuit board, and is typically disposed on a lower side (bottom) of the array substrate. The DPO side is opposite to the DP side, i.e., disposed on an upper side (top) of the array substrate. In other embodiments, the positions of the DP side and the DPO side are interchanged, which is not limited herein.

In the related art, GOA units are disposed on the left and right sides of the array substrate, resulting in wider bezels on the left and right sides of the display panel. In the present disclosure, the plurality of GOA units are arranged in the DPO region, such that the left and right sides of the array substrate do not need to be provided with the GOA units, and thus the left and right sides of the display panel occupy narrower bezels. In this way, the narrow bezel design for the left and right sides of the display panel is achieved.

As illustrated in FIG. 1, the DP region 1021 is arranged with at least one integrated circuit (IC). In some embodiments, one IC is arranged as illustrated in FIG. 1, and in other embodiments, two or more ICs are arranged at the same time. The IC is configured to provide various signals and functions required for the GOA unit, such as a ground signal (GND), a common signal (VCOM), an electrostatic discharge (ESD) function, and the like. The IC is connected to the GOA unit by peripheral region wires, which is not repeated herein.

Only one peripheral region wire 2001 is illustrated in FIG. 1 to connect the IC 2000 to the GOA unit 200, and actually, there are a plurality of the wires 2001, which is not limited herein.

In addition, the IC supplies data signals for data lines in the display region.

The present disclosure provides a gate fanout in active region (GIA) technique of placing the GOA units on the DPO side, such that the left and right bezels of the display panel become narrow. The array substrate according to the present disclosure is an array substrate of a thin film transistor liquid crystal display (TFT-LCD), which is allocable to an in-vehicle scenario, achieving narrower left and right bezels of the product on the basis of ensuring the high reliability requirements of the in-vehicles. In some embodiments, in-vehicle display panels are more suitable for splicing screen solutions of in-vehicle display panels after the achievement of left and right narrow bezels.

Of course, the array substrate according to the present disclosure is also applicable to other scenarios such as smartphones and tablet PCs.

In addition, the technical solution of the present disclosure is compatible with the touch and display driver integration (TDDI) solution with in-unit. That is, the array substrate according to the embodiments of the present disclosure includes an array unit layer and a touch layer, whit the touch layer stacked on the display layer, and the DPO side bezel is also capable of being fully utilized, such that a ratio of the four side bezels is more harmony.

In some embodiments, a relation between the number of pixel regions in one row arranged along the first direction and the number of pixel regions in one column arranged along the second direction has various cases, and the corresponding narrow bezel effects of the display panel vary in different cases.

In some embodiments, widths of four bezels of an in-vehicle display panel provided by the related art are: an upper bezel of 2.5 mm, a left bezel of 2.5 mm, a right bezel of 2.5 mm, and a lower bezel of 5 mm. The GOA units are arranged in the left and/or right bezels. In some embodiments, all the GOA units are arranged in the left bezel, and there is no spacing between the GOA units, or, in some embodiments, the GOA units are organized into two groups arranged on the left and right sides, and the GOA units on each side are spaced apart; the upper bezel is unused; and the ICs and pads are arranged in the lower bezel. The narrow bezel effects in different cases are described hereinafter using the above as an example.

In a first case, the number of pixel regions in one row is equal to the number of pixel regions in one column. In this case, where the plurality of GOA units are arranged on the DPO side, the dimension of a single GOA unit remains unchanged both in the first direction and the second direction, such that arranging the GOA units on the DPO side does not result in widening of the bezel of the DPO side. In this way, it is possible to maintain the width of the DPO side unchanged when the left and right side bezels become narrower. In some embodiments, in the case the GOA units are arranged in the upper bezel, the width of the upper bezel remains unchanged at 2.5 mm, the widths of the left and right bezels are reduced to 1.5 mm, and the width of the lower bezel remains unchanged at 5 mm.

In a second case, the number of pixel regions in one row is less than the number of pixel regions in one column. In this case, where the plurality of GOA units are arranged on the DPO side, the dimension of a single GOA unit becomes smaller in the first direction and larger in the second direction, and thus the width of the upper bezel is slightly increased, and the left and right bezels become narrower. In some embodiments, in the case that the GOA units are arranged in the upper bezel, the width of the upper bezel becomes 3.5 mm, the widths of the left and right bezels are reduced to 1.5 mm, and the width of the lower bezel remains unchanged at 5 mm. In this way, the overall width of the bezel is still reduced. In addition, because the panel splicing in the field of in-vehicle and other fields relies on the left and right side bezels, the narrowing of the left and right side bezels is capable of satisfying the splicing requirements in these fields.

In a third case, the number of pixel regions in one row is greater than the number of pixel regions in one column. In this case, the dimension of one of the GOA units 200 in the first direction is greater than the dimension of one of the pixel regions 1011. In the related art, the GOA units 200 are arranged on the left and right sides of the array substrate. Because the number of GOA units 200 is the same as or similar to the number of pixel regions 1011 in one column, the dimension of a single GOA unit 200 in the first direction is the same as or similar to the dimension of the pixel region 1011 (in the column direction). In the present disclosure, the plurality of GOA units 200 are arranged in the DPO region 1022. Because the number of pixel regions 1011 in one row is greater than the number of pixel regions 1011 in one column, the number of GOA units 200 is less than the number of pixel regions 1011 in one row. In this case, the dimension of a single GOA unit 200 in the first direction is greater than the dimension of the pixel region 1011. That is, the dimension of the GOA unit 200 in the first direction is increased as compared to that in the related art, and thus the dimension of the GOA unit 200 in the second direction is reduced in the case that an overall region of the GOA unit 200 remains unchanged, such that the GOA unit 200 occupies a narrower bezel when arranged in the DPO region 1022 compared to when arranged on the left or the right side of the display panel, and thus the narrow bezel design of the whole display panel is achieved. In some embodiments, in the case that the GOA unit is arranged in the upper bezel, the width of the upper bezel remains unchanged at 2.5 mm, the widths of the left bezel and the right bezel are reduced to 1.5 mm, and the width of the lower bezel remains unchanged at 5 mm.

As illustrated in FIG. 1, the plurality of gate lines 300 include a plurality of first gate lines 301 and a plurality of second gate lines 302. An extension direction of the first gate line 301 is consistent with the second direction, and an extension direction of the second gate line 302 is consistent with the first direction. The plurality of second gate lines 302 are respectively connected to the plurality of GOA units 200 by the plurality of first gate lines 301.

The consistent directions are identical, such as parallel to each other, or substantially identical. In some embodiments, there is an included angle within a range, such as an angle of 10 degrees or less.

The first gate line is also referred to as a vertical gate line (V gate), and the second gate line is also referred to as a horizontal gate line (H gate).

The first gate line and the second gate line are straight lines or not, such as folded lines.

In the structure illustrated in FIG. 1, each of the second gate lines is connected to one of the GOA units by one of the first gate lines, in which case all the GOA units are cascaded successively and the corresponding display panel is driven in a unidirectional driver scheme. That is, the plurality of GOA units are driven in a unidirectional direction from left to right or right to left.

Each of the GOA units scans the corresponding row of pixels in the same direction as the driving direction of the plurality of GOA units. In some embodiments, the plurality of GOA units from left to right are successively connected to the plurality of rows of pixels from top to bottom, or the plurality of GOA units from left to right are successively connected to the plurality of rows of pixels from bottom to top. Thereby, a progressive scanning from top to bottom or bottom to top is achieved.

In some embodiments, the plurality of GOA units 200 are arranged in the DPO region 1022 along the first direction, and the second gate lines corresponding to each row of pixels also extend along the first direction. Therefore, the plurality of GOA units 200 fail to be directly connected to the plurality of second gate lines 302, and it is necessary to arrange the first gate lines 301 to connect the GOA units 200 and the second gate lines 302, such that the GOA units 200 are capable of outputting gate driver signals to the second gate lines 302.

The number of the second gate lines 302 is equal to the number of rows of the pixel regions 1011, and one second gate line 302 is arranged for each row of pixel regions 1011. The number of first gate lines 301 is equal to the number of second gate lines 302.

For the first case described above, the number of first gate lines 301 is equal to the number of columns of pixel regions 1011, and thus it is sufficient to arrange one first gate line 301 per column of pixels.

For the second case described above, the number of first gate lines 301 is greater than the number of columns of pixel regions 1011, and thus it is necessary to arrange at least one first gate line 301 per column of pixels.

For the third case described above, the number of first gate lines 301 is smaller than the number of columns of pixel regions 1011. Thus, the first gate lines 301 are arranged in only a portion of the columns of pixel regions 1011, and another portion of the columns of pixel regions 1011 are not provided with the first gate lines 301. Each of the pixel regions corresponds to a pixel unit, and each of the pixel units includes a plurality of sub-pixels. The arrangement of the first gate lines 301 in the third case is described below.

In some embodiments, the plurality of columns of pixel regions 1011, in which the plurality of first gate lines 301 are disposed, are arranged adjacent to each other.

In some embodiments, the plurality of adjacent columns of pixel regions 1011 are disposed in the middle of the display region 1001. That is, the plurality of first gate lines 301 are within a middle section of the display region 1001.

In the embodiments, by arranging the first gate lines 301 in the middle of the display region 1001, the loss in transmitting the gate driver signals to the pixels on the left and right sides of the display panel over the first gate lines 301 is ensured to be the same, and thus the display uniformity is improved.

The plurality of adjacent columns of pixel regions 1011 in the middle of the display region 1001 refer to a plurality of columns of pixel regions 1011 acquired by spreading out from a column of pixel regions 1011 in a middle-most portion of the display region 1001 to two sides. A difference between distances from two columns of pixel regions 1011 respectively disposed on two edges of the plurality of adjacent columns of pixel regions 1011 to two columns of pixel regions 1011 respectively disposed on two edges of the display region 1011 is less than a threshold. That is, the difference between the distance from the leftmost column of pixel regions 1011 of the plurality of adjacent columns of pixel regions 1011 to the leftmost column of pixel regions 1011 of the display region 1001 and the distance from the rightmost column of pixel regions 1011 of the plurality of adjacent column of pixel regions 1011 to the rightmost column of pixel regions 1011 of the display region 1001 is less than the threshold, such as less than a width of 10 columns of pixel regions.

In some embodiments, each of the first gate lines 301 is correspondingly arranged in one column of pixel regions 1011, and one first gate line 301 is arranged in each column of pixel regions 1011 in the middle section of the display region 1001, such that the vertical gate lines 300 are prevented from being too close together, and thus it is convenient for forming without interference.

FIG. 1 uses only a small number of pixel regions as an example, and the actual display panel has a much larger number of pixel regions. The following is an example of a display panel with a resolution of H*V, wherein H represents the number of display regions in one row, V represents the number of display regions in one column, and H and V are positive integers.

In the case that H/V≥1, one first gate line is placed in each column of pixel regions (corresponding to three columns of sub-pixels). The number of first gate lines arranged in the display panel is greater than the number of second gate lines, and the middle section of the display panel is preferred for arranging the first gate lines, such that the uniformity of the display effect is better.

In using the technical solutions according to the embodiments of the present disclosure, the dimension Pitch_GOA of the GOA unit in the first direction is calculated according to the following equation:

$$Pitch\_GOA = Pitch\_Pixel * H/V$$

Pitch_Pixel represents the dimension of the pixel region in the first direction, H represents the number of pixel regions in one row, and V represents the number of pixel regions in one column, which is also equal to the number of GOA units.

In other embodiments, the number of GOA units is slightly greater than the number of pixel regions in one row, such as V+M.

In this case, Pitch_GOA=Pitch_Pixel*H/(V+M).

The number of GOA units is greater than the number of pixel regions in one column by M, and these M GOA units are designed to be redundant dummy GOA units, but of course, the extra GOA units are used for other purposes as well, which is not limited herein.

In some embodiments, a value of the resolution H*V of the display panel is designed as desired. In some embodiments, for a 2K resolution display panel, the value of H is taken as 2560 and the value of V is taken as 1440; and for a 4K resolution display panel, the value of H is taken as 3840 and the value of V is taken as 2160.

In addition, a value of M is taken as desired and, in some embodiments, the value of M is taken as 8.

Based on the above equation, the dimension of the GOA unit in the first direction is larger compared to that in the related art, such that the dimension thereof in the second direction is smaller, and thus the bezel becomes narrower.

In some embodiments, the plurality of adjacent columns of pixel regions 1011 are within a left region or a right region of the display region 1001. That is, the plurality of first gate lines 301 are within the left region or the right region in the display region 1001.

In some embodiments, the plurality of columns of pixel regions 1011, where the plurality of first gate lines 301 are disposed, are not arranged adjacent to each other.

In some embodiments, the plurality of columns of pixel regions 1011, where the plurality of first gate lines 301 are disposed, are evenly spaced apart, such that the interference between the plurality of first gate lines 301 is minimized. In some embodiments, adjacent two first gate lines 301 are spaced apart by one column of pixel regions 1011.

In the same embodiments, adjacent first gate lines 301 are equally spaced apart from each other, or, adjacent first gate lines 301 are spaced apart from each other by different spacing.

Furthermore, in the embodiments, positions, where the plurality of first gate lines 301 are disposed in the display region 1001, are to the left, to the right, or centered, which is not limited herein.

Figure 2:
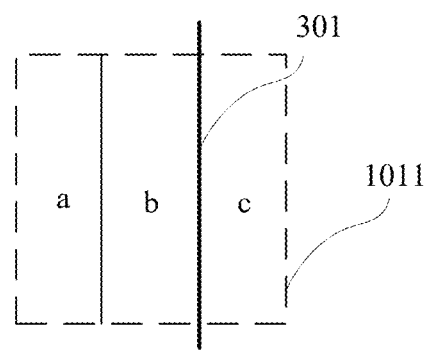
FIG. 2 is a schematic diagram of a partial structure of an array substrate according to some embodiments of the present disclosure.

FIG. 2 is a schematic diagram of a partial structure of an array substrate according to some embodiments of the present disclosure. Referring to FIG. 2, the pixel region 1011 includes a first sub-region a, a second sub-region b, and a third sub-region c that are arranged along the first direction. The first sub-region a is a green sub-region, and the first gate line 301 is between the second sub-region b and the third sub-region c.

The human eye is more sensitive to green light. In the case that the first gate line 301 is arranged in the green sub-region, the first gate line 301 couples with electrodes within the green sub-region, and thus the luminance of the green light is affected. Therefore, to avoid the effect of the first gate line 301 on green sub-pixels, the first gate line 301 is arranged between the sub-regions of the other colors, such that the first gate line 301 has the least impact on the human visual perception.

In some embodiments, the pixel region 1011 includes red, green, and blue sub-regions, and the second sub-region and the third sub-region are respectively the red sub-region and the blue sub-region.

Referring to FIG. 2, the first sub-region a, the second sub-region b, and the third sub-region c are arranged successively, and the first gate line 301 is between the second sub-region b and the third sub-region c that are within one pixel region 1011. Alternatively, the first gate line 301 is within the second sub-region or the third sub-region.

In some embodiments, the above sub-regions are successively arranged in an order of the second sub-region, the first sub-region, and the third sub-region. The first gate line 301 is between the second sub-region and the third sub-region of adjacent two pixel regions 1011.

In addition, the pixel region 1011 further includes a white sub-region. That is, the pixel region 1011 includes four sub-regions of red, green, blue, and white. In this case, the second sub-region and the third sub-region are any two of the red, blue, and white sub-regions.

In the case that the first gate lines 301 are not arranged in the columns of the pixel regions 1011 corresponding to output terminals of the GOA units 200, it is necessary to connect the GOA units 200 and the first gate lines 301 by additional connection lines. The description is given hereinafter using a scenario where the plurality of the first gate lines 301 are arranged adjacent to each other in the plurality of columns of the pixel regions 1011 in the middle of the display region 1001 as an example.

Figure 3:
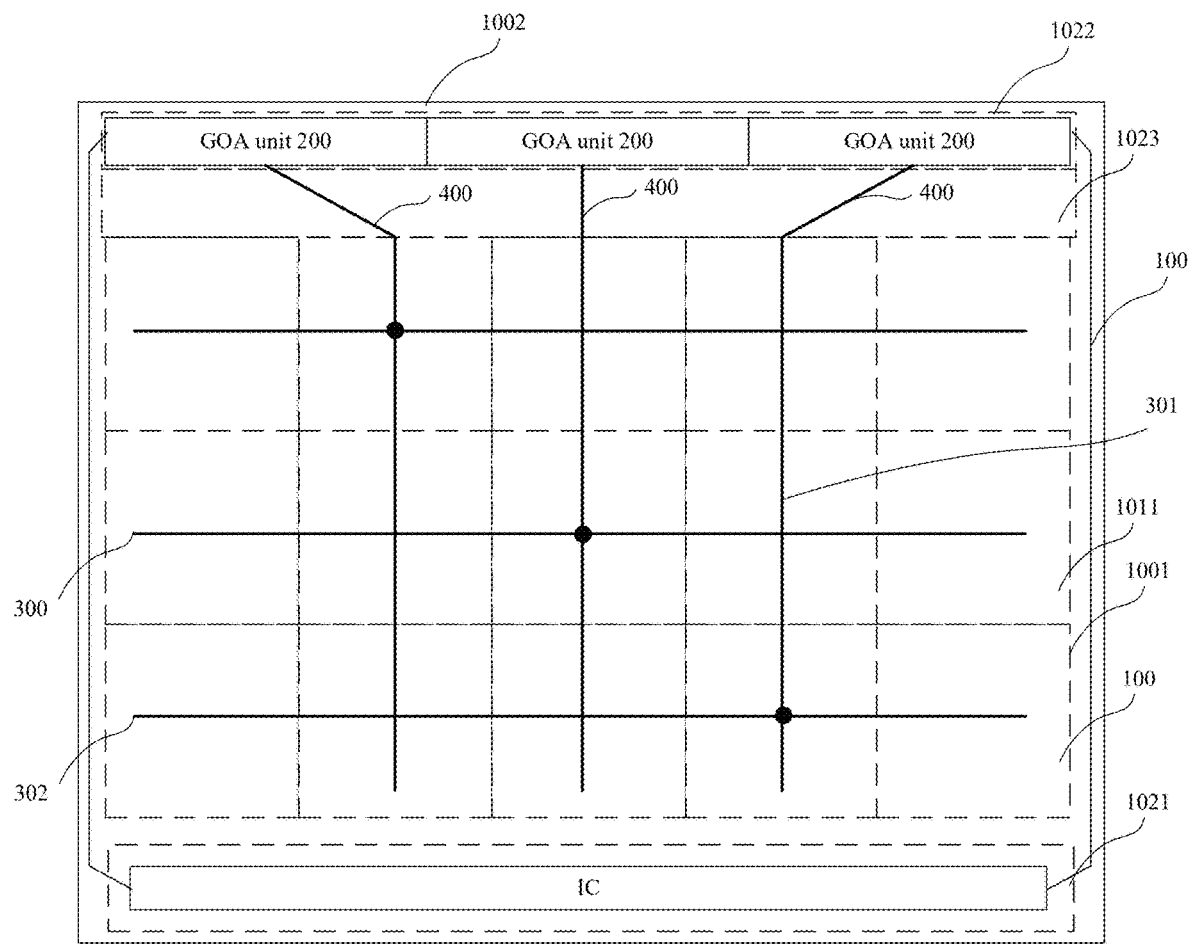
FIG. 3 is a schematic structural diagram of another array substrate according to some embodiments of the present disclosure.

FIG. 3 is a schematic structural diagram of another array substrate according to some embodiments of the present disclosure. Referring to FIG. 3, the peripheral region 1002 further includes a connection region (Fanout) 1023 between the display region 1001 and the DPO region 1022.

The array substrate further includes a plurality of connection lines 400 in the connection region 1023. The plurality of first gate lines 301 are respectively connected to the plurality of GOA units 200 by the plurality of connection lines 400.

In the embodiments, by providing the connection region and the connection lines, the plurality of GOA units 200 on the DPO side are capable of being connected to the plurality of first gate lines 301, which are concentrated in this portion of the display region 1001, in one-to-one correspondence. In addition, although the connection region is added, the connection region requires only the arrangement of the connection lines, and thus the required width thereof is small. Moreover, the GOA units and the connection region arranged on the DPO side do not cause an increase of the width of the DPO side, and the widths of the left and right sides of the display panel are greatly reduced without the GOA units.

In some embodiments, at least a portion of the connection lines 400 are straight.

In some embodiments, a portion of the connection lines are straight and another portion of the connection lines are curved and/or folded. In some embodiments, all of the connection lines are straight.

In some embodiments, the connection lines are all straight lines arranged to be inclined with respect to the second direction.

In some embodiments, the connection lines include both straight lines arranged to be inclined with respect to the second direction and straight lines in the same direction as the second direction.

Inclined with respect to the second direction means the direction of the connection line has an included angle between the second direction, the angle being acute. In the case that the connection line is a straight line, a length of the connection line is the shortest, such that the loss of a signal transmitted over the connection line is minimized. In addition, the arrangement of the connection lines is simple and the required width of the connection region is small.

In some embodiments, the connection lines are all curved and/or folded.

In some embodiments, the array substrate further includes a plurality of pixel units and a plurality of data lines. The plurality of pixel units are respectively within the plurality of pixel regions 1011, and the plurality of data lines are respectively within the plurality of columns of pixel regions 1011.

Figure 4:
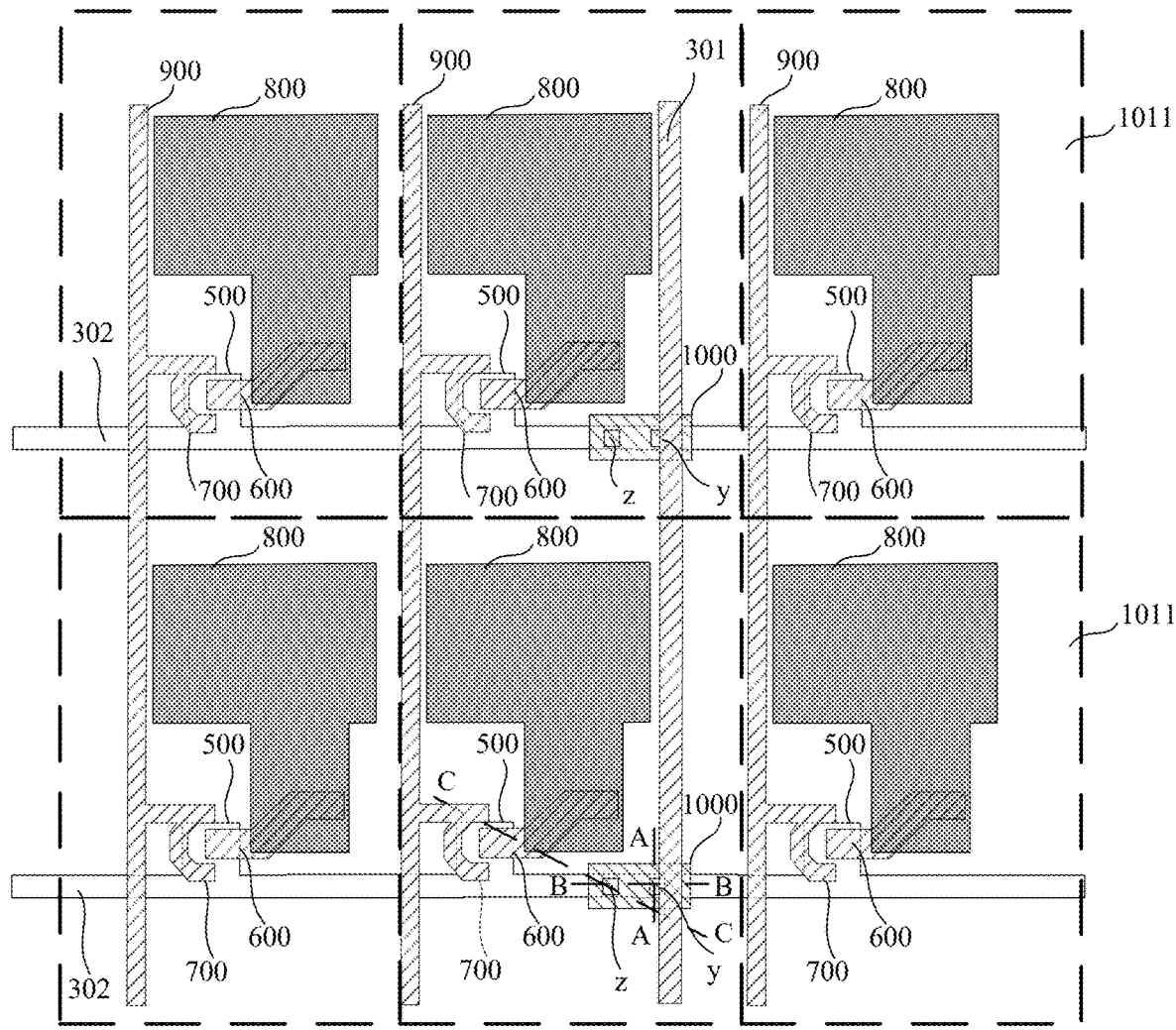
FIG. 4 is a schematic structural diagram of a pixel unit according to some embodiments of the present disclosure.

FIG. 4 is a schematic structural diagram of a pixel unit according to some embodiments of the present disclosure. FIG. 4 illustrates the pixel units in two pixel regions 1011 arranged vertically, wherein each of the pixel regions includes three sub-regions, and pixel units (usually corresponding to red, green, and blue colors) are arranged in each of the sub-regions. A row of pixel regions corresponds to one second gate line 302, a column of pixel regions (3 columns of sub-regions) corresponds to one first gate line 301, and each of the columns of sub-regions corresponds to one data line 900. The first gate line 301 is arranged in one of the columns of sub-regions.

Referring to FIG. 4, the pixel unit includes a gate 500, an active layer (not illustrated), a source 600, a drain 700, a pixel electrode 800, and other structures.

The gate 500 is connected to the second gate line 302, the active layer is connected to the source 600 and the drain 700, the pixel electrode 800 is connected to the source 600, and the data line 900 is connected to the drain 700.

In some embodiments, the array substrate further includes a gate layer, a gate insulator layer, a source-drain layer, a protection layer, and a common electrode layer that are successively stacked on the substrate. The film layers all belong to the above array unit layer, and the common electrode layer includes a gate connection line.

The first gate line is disposed in the source-drain layer, the second gate line is disposed in the gate layer, the first gate line is connected to the gate connection line through a first via in the protection layer, and the second gate line is connected to the gate connection line through a second via in the gate insulator layer and the protection layer.

Figure 5:
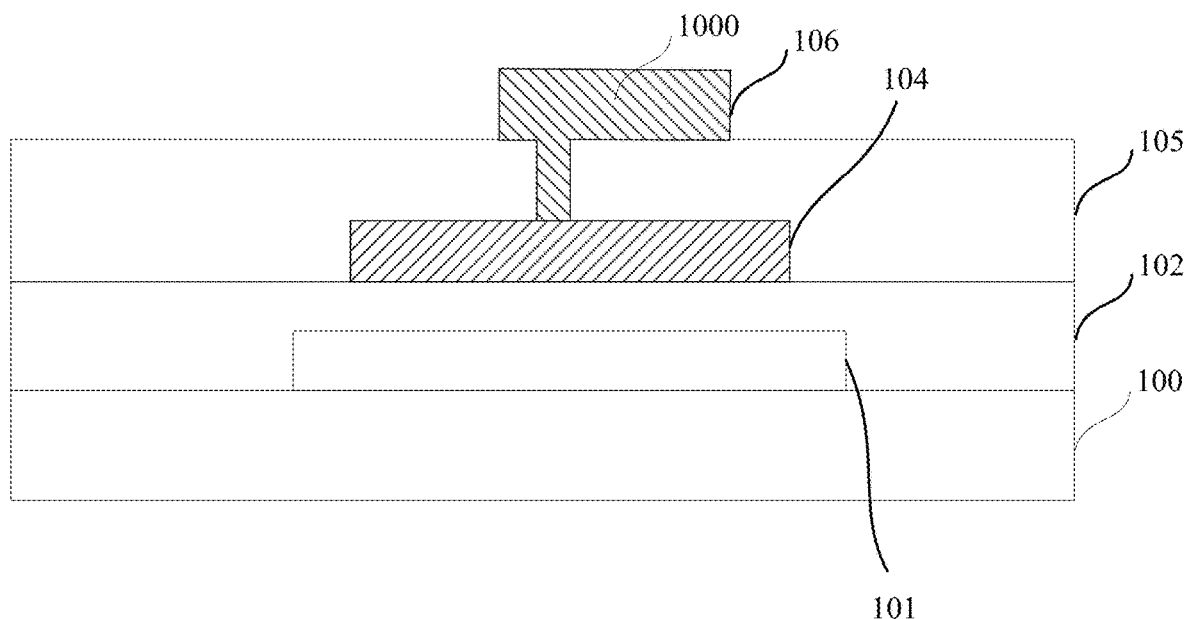
FIG. 5 is a schematic diagram of a cross-sectional structure of FIG. 4 in an A-A direction.
Figure 6:
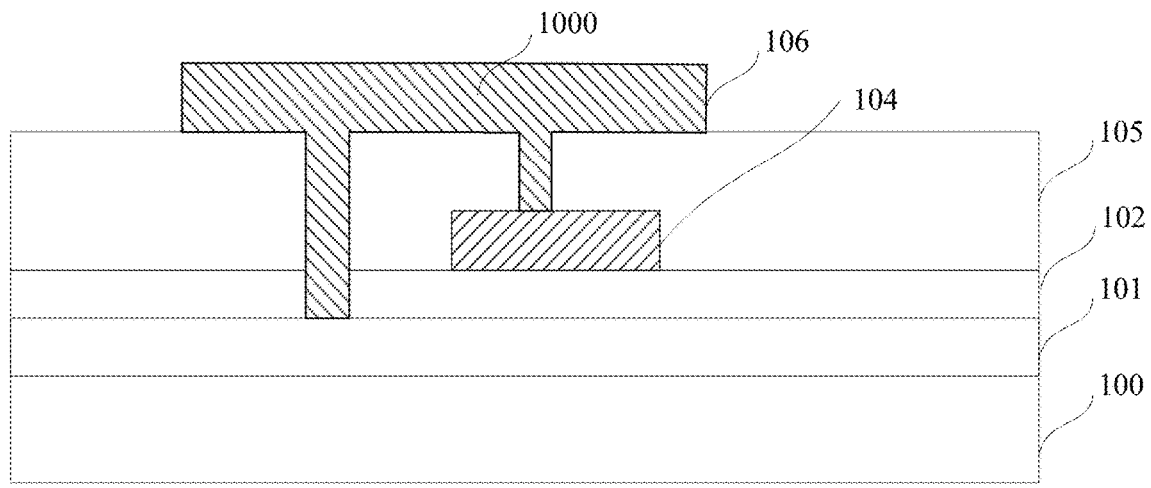
FIG. 6 is a schematic diagram of a cross-sectional structure of FIG. 4 in a B-B direction.
Figure 7:
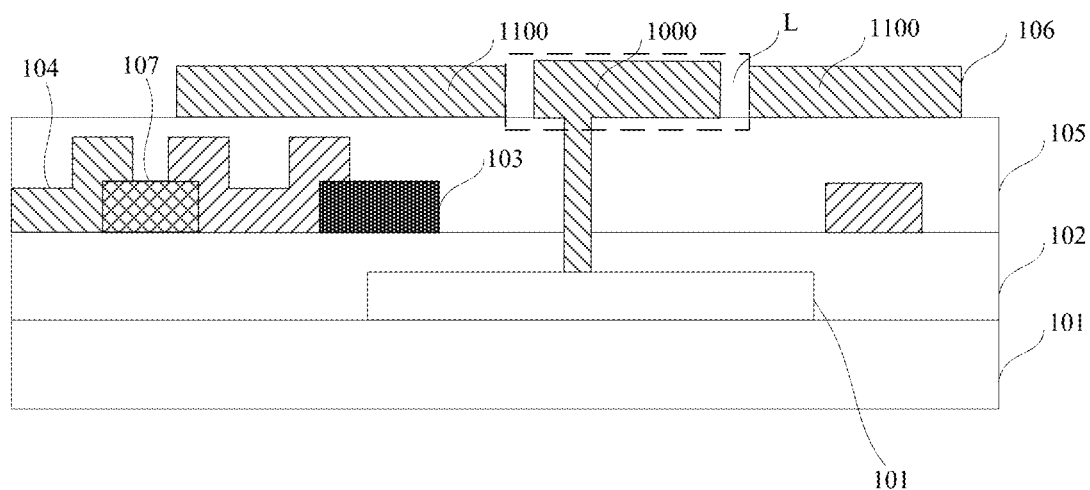
FIG. 7 is a schematic diagram of a cross-sectional structure of FIG. 4 in a C-C direction.

FIG. 5 is a schematic diagram of a cross-sectional structure of FIG. 4 in an A-A direction. FIG. 6 is a schematic diagram of a cross-sectional structure of FIG. 4 in a B-B direction. FIG. 7 is a schematic diagram of a cross-sectional structure of FIG. 4 in a C-C direction. Referring to FIG. 5 to FIG. 7, the array substrate further includes a gate layer 101, a gate insulator layer 102, a pixel electrode layer 103, a source-drain layer 104, a protection layer 105, and a common electrode layer 106 that are disposed on the substrate 100, wherein the common electrode layer 106 includes a gate connection line 1000. The gate layer 101 includes the gate 500, the pixel electrode layer 103 includes the pixel electrode 800, the source-drain layer 104 includes the data line 900, the source 600, and the drain 700, and the common electrode layer 106 includes the gate connection line 1000 and a common electrode 1100. The source 600 and the pixel electrode 800 are connected to each other, and the connection herein is an electrical connection.

The pixel electrode layer 103 and the source-drain layer 104 are both disposed on the gate insulator layer 102.

The first gate line 301 is disposed in the source-drain layer 104, the second gate line 302 is disposed in the gate layer 101, the first gate line 301 is connected to the gate connection line 1000 through a first via y in the protection layer 105, and the second gate line 302 is connected to the gate connection line 1000 through a second via z in the gate insulator layer 102 and the protection layer 105.

In the embodiments, the second gate line 302 is indirectly connected to the first gate line 301 through the common electrode layer, such that the first via and the second via are formed by a one-time patterning process (MASK process), which saves the MASK process and improves the overall process flow compared to the solution in which the first gate line 301 and the second gate line 302 are directly connected.

Figure 8:
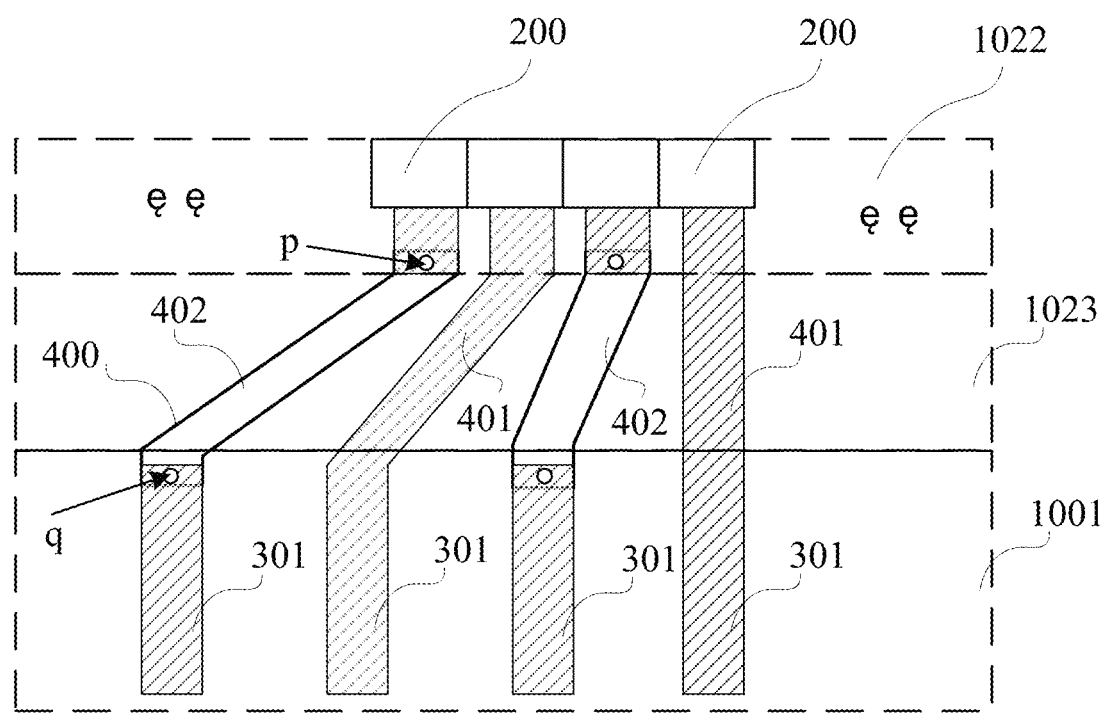
FIG. 8 is a schematic connection diagram of connection lines according to some embodiments of the present disclosure.

The film layer structure described above is a film layer structure for the display region, and in the connection region, the array substrate includes the gate layer 101, the gate insulator layer 102, and the source-drain layer 104 that are disposed on the substrate 100. FIG. 8 is a schematic connection diagram of connection lines according to some embodiments of the present disclosure. Referring to FIG. 8, the plurality of connection lines 400 include a plurality of first connection lines 401 and a plurality of second connection lines 402.

The first connection line 401 is disposed in the source-drain layer. The first connection line 401 is directly connected to the output terminal of the GOA unit 200 at a position, proximal to the DPO region 1022, of the connection region 1023, and the first connection line 401 is directly connected to the first gate line 401 at a position, proximal to the display region 1001, of the connection region 1023.

The output terminal of the GOA unit 200 is disposed in the source-drain layer.

The second connection 402 is disposed in the gate layer, the second connection 402 is connected to the output terminal of the GOA unit 200 through a via p at the position, proximal to the DPO region 1022, of the connection region 1023, and the second connection 402 is connected to the first gate line 401 through a via q at the position, proximal to the display region 1001, of the connection region 1023.

In some embodiments, orthographic projections of the plurality of first connection lines on the substrate and orthographic projections of the plurality of second connection lines on the substrate are alternated with each other.

In the embodiments, by alternately arranging the connection lines in two film layers, an area of the occupied connection region is reduced while maintaining the width of the connection line, and thus the bezel width is saved.

In some embodiments, the array substrate includes the gate layer 101 disposed on the substrate 100. In the embodiments, the connection line 400 is connected to the output terminal of the GOA unit through a via at a position, proximal to the DPO region, of the connection region; and the connection line 400 is connected to the first gate line 301 through a via at a position, proximal to the display region, of the connection region. The connection line 400 in the embodiments is illustrated as the second connection line 402 in FIG. 8.

In some embodiments, in the connection region, the array substrate includes the gate layer 101, the gate insulator layer 102, and the source-drain layer 104 that are disposed on the substrate 100. In the embodiments, the connection line 400 is directly connected to the output terminal of the GOA unit at a position, proximal to the DPO region, of the connection region; and the connection line 400 is directly connected to the first gate line 301 at a position, proximal to the display region, of the connection region. The connection line 400 in the embodiments is illustrated as the first connection line in FIG. 8.

In addition, the gate layer forms a cut line at an outermost edge of the peripheral region to mark a cut channel in cutting the panel.

In some embodiments, the array substrate according to the present disclosure is formed using a 6MASK process, in order: 1 gate layer MASK, 2 active layer MASK, 3 pixel electrode layer MASK, 4 source-drain electrode layer MASK, 5 gate insulator layer+protection layer MASK, and 6 common electrode layer MASK. The gate insulator layer and the protection layer are formed using a one-time MASK process, which greatly saves the time and material required for the MASK process compared to the 8MASK process used in the related art.

In addition to saving the process flow by using the 6MASK process, by performing the light leakage simulation experiment on the array substrate formed by the 6MASK process, the result shows that, compared to the array substrate made by the 8MASK process, the substrate leakage of the array substrate formed by the 6MASK process has not worsened even though the process has been saved and the cost has been reduced. That is, the light leakage is prevented from being increased in the case that the cost is saved.

Referring to FIG. 7, the common electrode 1100 has a hollow-out region L. The gate connection line 1000 is within the hollow-out region L, and the common electrode 1100 and the gate connection line 1000 are insulated from each other.

In the embodiments, by arranging the common electrode to surround the first via and the second via, electric fields around the first via and the second via are shielded, such that a coupling capacitance between the pixel electrode and the first gate line is reduced, and thus coupling effects between the pixel electrode and the other signal lines are reduced, and thereby mura is eliminated.

For a single pixel unit, both the pixel electrode and the data line have the coupling effects with other signal lines, which respectively are denoted as $\Delta Vp1$ and $\Delta Vp2$, wherein:

$$\Delta Vp1 = Cgp*(VGH-VGL)/(Cgp+Cgs+Cpd++Cgp2);$$

and $$\Delta Vp2 = Cgd*(VGH-VGL)/(Cgd+Cdcom+Cpd+Cgd1).$$

Cgp represents a coupling capacitance between the pixel electrode and the first gate line, VGH represents a gate high level, VGL represents a gate low level, Cgs represents a coupling capacitance between the pixel electrode and the second gate line of a current row, Cst represents a coupling capacitance between the pixel electrode and the common electrode, Cpd represents a coupling capacitance between the pixel electrode and the data line, Cgp1 represents a coupling capacitance between the pixel electrode and the second gate line of a previous row, and Cgp2 represents a coupling capacitance between the pixel electrode and the second gate line of a next row. Cgd represents a coupling capacitance between the data line and the first gate line, Cdcom represents a coupling capacitance between the data line and the common electrode, and Cgd1 represents a coupling capacitance between the data line and the second gate line of a current row.

Some embodiments of the present disclosure are caused to shield the coupling electric field between the pixel electrode and the first gate line in a transverse direction by arranging the common electrode around the first via and the second via, such that the coupling capacitance Cgp is reduced, and thus $\Delta Vp1$ is reduced.

In some embodiments, the first via and the second via are arranged at a lower right corner of the pixel region, thereby facilitating the design of the common electrode around the first via and the second via. In other embodiments, the first via and the second via are arranged at other positions, which is not limited herein.

Referring to FIG. 7, the array substrate further includes an active layer 107. The active layer 107 includes an active layer pattern, and the active layer 107 is between the gate insulator layer 102 and the protection layer 105. Both the source and the drain are connected to the active layer pattern.

The substrate 100 is a glass substrate 100. Both the gate layer and the source-drain layer are metal layers or indium tin oxide layers. The gate insulator layer is an insulator layer formed by one of silicon oxide, silicon nitride, or silicon oxynitride, or a stacked layer formed by at least two thereof. The active layer is a polysilicon layer or an amorphous silicon layer. The planarization layer is a resin layer, a planarization layer formed by one of silicon oxide, silicon nitride, or silicon oxynitride, or a stacked layer formed by at least two thereof. Both the common electrode layer and the pixel electrode layer are indium tin oxide electrode layers.

In the structures of FIG. 1 and FIG. 3, the corresponding display panel utilizes a unidirectional driving scheme. In the case that the number of the pixel regions in one row arranged along the first direction is greater than or equal to twice the number of the pixel regions in one column arranged along the second direction, the display panel corresponding to the array substrate according to the embodiments of the present disclosure further utilizes a bi-directional driving scheme to improve a refresh speed of the display panel.

Figure 9:
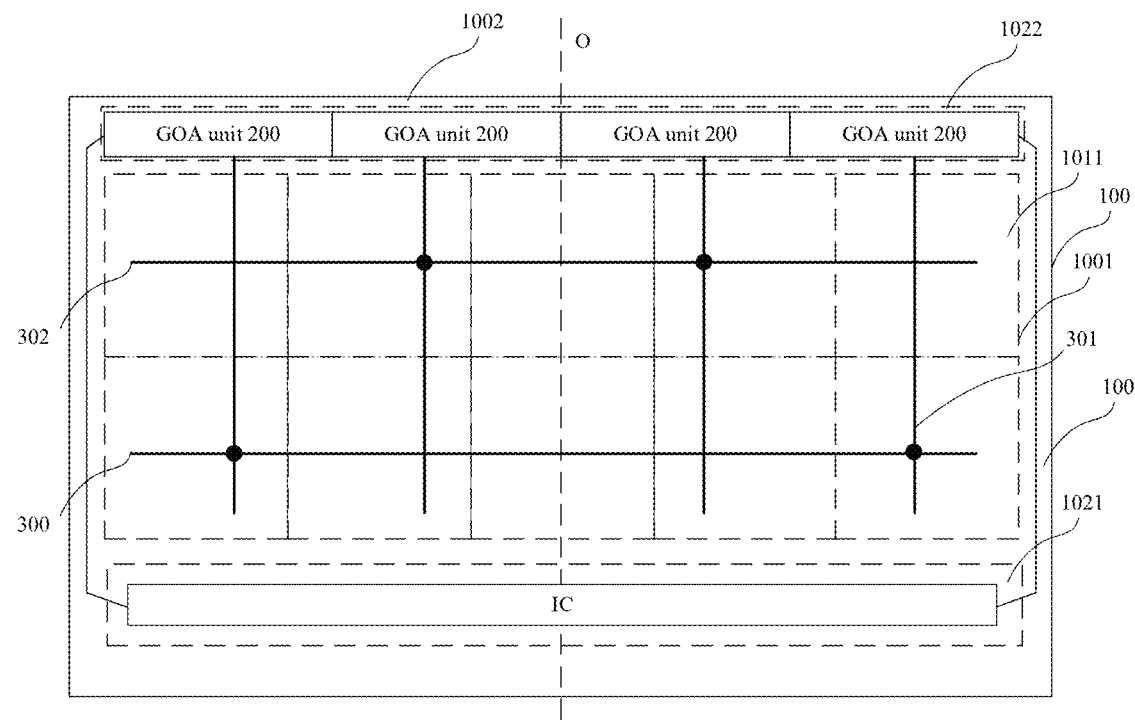
FIG. 9 is a schematic structural diagram of still another array substrate according to some embodiments of the present disclosure.

The description is given in conjunction with FIG. 9. FIG. 9 is a schematic structural diagram of still another array substrate according to some embodiments of the present disclosure. Referring to FIG. 9, the number of GOA units 200 is twice the number of pixel regions in one column, and the number of first gate lines 301 is equal to twice the number of the second gate lines 302. Each of the second gate lines 302 is connected to two GOA units 200 through two first gate lines 301, and the two GOA units 200 connected to the same second gate line 302 are arranged symmetrically with respect to a centerline O. The centerline is a centerline of the substrate 100 extending along the second direction.

In the structure illustrated in FIG. 9, all GOA units are organized into two groups. In some embodiments, all GOA units are organized into two groups based on the left side and right side of the centerline, the plurality of GOA units in each group are cascaded successively, and the corresponding display panel utilizes the bi-directional driving scheme. That is, one group of GOA units is driven from left to right, and the other group is driven from right to left; or one group of GOA units is driven from right to left, and the other group is driven from left to right.

Using FIG. 9 as an example, two GOA units 200 on the left side are organized into a group, two GOA units on the right side are organized into a group, and two GOA units 200 symmetrical to the centerline O drive a row of pixels simultaneously. In some embodiments, a second row of pixels is driven by the two GOA units 200 on two sides together, such that this row of pixels is illuminated in sequence from the two sides to the middle.

Each of the GOA units scans the corresponding row of pixels in the same direction as the driving direction of the plurality of GOA units. In some embodiments, the plurality of GOA units from left to right are successively connected to a plurality of rows of pixels from top to bottom, or the plurality of GOA units from left to right are successively connected to a plurality of rows of pixels from bottom to top, whereas the two groups of GOA units are successively connected, in reversed directions, to the plurality of rows of pixels, such that the progressive scanning from top to bottom or bottom to top is achieved.

In the embodiments, the number of pixel regions in one row arranged along the first direction is greater than twice the number of pixel regions in one column arranged along the second direction. Therefore, by designing the number of GOA units to be twice the number of second gate lines (i.e., twice the number of pixel regions in one column), the dimension of the GOA unit in the first direction is still larger than that of the related art, such that the dimension of the GOA unit is smaller in the second direction, and thus the narrow bezel design is achieved.

In other embodiments, the number of GOA units 200 is greater than twice the number of pixel regions in one row. In some embodiments, V is the number of pixel regions in one row, and the number of GOA units in each group is V+8. In such embodiments, in the case that the number of GOA units 200 is less than or equal to the number of pixel regions in one row, it is still possible to ensure that the dimension of the GOA unit in the first direction is greater than the dimension of the pixel region.

The present disclosure provides a display panel. The display device includes an array substrate as described above.

The present disclosure provides a display device. The display device includes a display panel as described above In particular embodiments, the display device according to some embodiments of the present disclosure is a smartphone, a tablet computer, a television, a monitor, a laptop computer, a digital photo frame, a navigator, and any other product or component having a display function.

Figure 10:
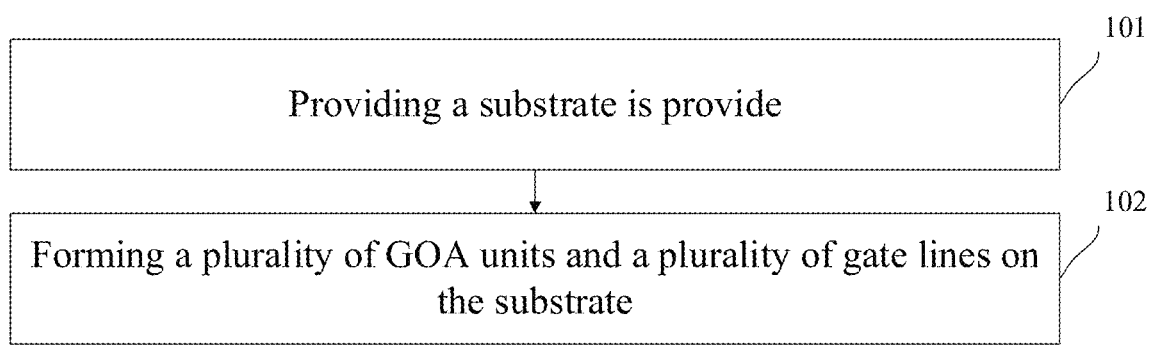
FIG. 10 is a flowchart of a method for manufacturing an array substrate according to some embodiments of the present disclosure.

FIG. 10 is a flowchart of a method for manufacturing an array substrate according to some embodiments of the present disclosure. Referring to FIG. 10, the method includes the following steps. In 101, a substrate is provided.

The substrate includes a display region and a peripheral region surrounding the display region, and the display region includes a plurality of pixel regions arranged in arrays.

In 102, a plurality of GOA units and a plurality of gate lines are formed on the substrate.

The plurality of GOA units are arranged along a first direction. The peripheral region includes a DP region and a DPO region that are arranged opposite to each other along a second direction on two sides of the display region. The plurality of GOA units are arranged in the DPO region, the plurality of gate lines are arranged in the display region, and the plurality of GOA units are electrically connected to the plurality of gate lines. The first direction and the second direction are intersected.

In some embodiments, a relation between the number of pixel regions in one row arranged along the first direction and the number of pixel regions in one column arranged along the second direction has various cases, and the corresponding narrow bezel effects of the display panel vary in different cases.

In some embodiments, widths of four bezels of an in-vehicle display panel provided by the related art are: an upper bezel of 2.5 mm, a left bezel of 2.5 mm, a right bezel of 2.5 mm, and a lower bezel of 5 mm. The GOA units are arranged in the left and/or right bezels. In some embodiments, all the GOA units are arranged in the left bezel, and there is no spacing between the GOA units, or, in some embodiments, the GOA units are organized into two groups on the left and right sides, and the GOA units on each side are spaced apart; the upper bezel is unused; and the ICs and pads are arranged in the lower bezel. The narrow bezel effects in different cases are described hereinafter using the above as an example.

In a first case, the number of pixel regions in one row is equal to the number of pixel regions in one column. In this case, where a plurality of GOA units are arranged on the DPO side, the dimension of a single GOA unit remains unchanged both in the first direction and the second direction, such that arranging the GOA units on the DPO side does not result in widening of the bezel of the DPO side. In this way, it is possible to maintain the width of the DPO side unchanged when the left and right side bezels become narrower. In some embodiments, in the case the GOA units are arranged in the upper bezel, the width of the upper bezel remains unchanged at 2.5 mm, the widths of the left and right bezels are reduced to 1.5 mm, and the width of the lower bezel remains unchanged at 5 mm.

In a second case, the number of pixel regions in one row is less than the number of pixel regions in one column. In this case, where a plurality of GOA units are arranged on the DPO side, the dimension of a single GOA unit becomes smaller in the first direction and larger in the second direction, and thus the width of the upper bezel is slightly increased, and the left and right bezels become narrower. In some embodiments, in the case that the GOA units are arranged in the upper bezel, the width of the upper bezel becomes 3.5 mm, the widths of the left and right bezels are reduced to 1.5 mm, and the width of the lower bezel remains unchanged at 5 mm. In this way, the overall width of the bezel is still reduced. In addition, because the panel splicing in the field of in-vehicle and other fields relies on the left and right side bezels, the narrowing of the left and right side bezels is capable of satisfying the splicing requirements in these fields.

In a third case, the number of pixel regions in one row is greater than the number of pixel regions in one column. In this case, the dimension of one of the GOA units in the first direction is greater than the dimension of one of the pixel regions. In the related art, the GOA units are disposed on the left and right sides of the array substrate. Because the number of GOA units is the same as or similar to the number of pixel regions in one column, the dimension of a single GOA unit in the first direction is the same as or similar to the dimension of the pixel region. In the present disclosure, the plurality of GOA units are arranged in the DPO region. Because the number of pixel regions in one row is greater than the number of pixel regions in one column, the number of GOA units is less than the number of pixel regions in one row. In this case, the dimension of a single GOA unit in the first direction is greater than the dimension of the pixel region. That is, the dimension of the GOA unit in the first direction is increased as compared to that in the related art, and thus the dimension of the GOA unit in the second direction is reduced in the case an overall region of the GOA unit remains unchanged, such that the GOA unit occupies a narrower bezel when arranged in the DPO region compared to when arranged on the left or the right side of the display panel, and thus the narrow bezel design of the whole display panel is achieved.

In some embodiments, the plurality of gate lines include a plurality of first gate lines and a plurality of second gate lines. An extension direction of the first gate line is consistent with the second direction, and an extension direction of the second gate line is consistent with the first direction. The plurality of second gate lines are connected to the plurality of GOA units respectively by the plurality of first gate lines. The plurality of first gate lines are within a middle section of the display region.

In the embodiments, by arranging the first gate lines 301 in the middle section of the display region 1001, the loss of transmitting gate driver signals to pixels on the left and right sides of the display panel over the first gate lines 301 is ensured to be the same, and thus the display uniformity is improved.

Figure 11:
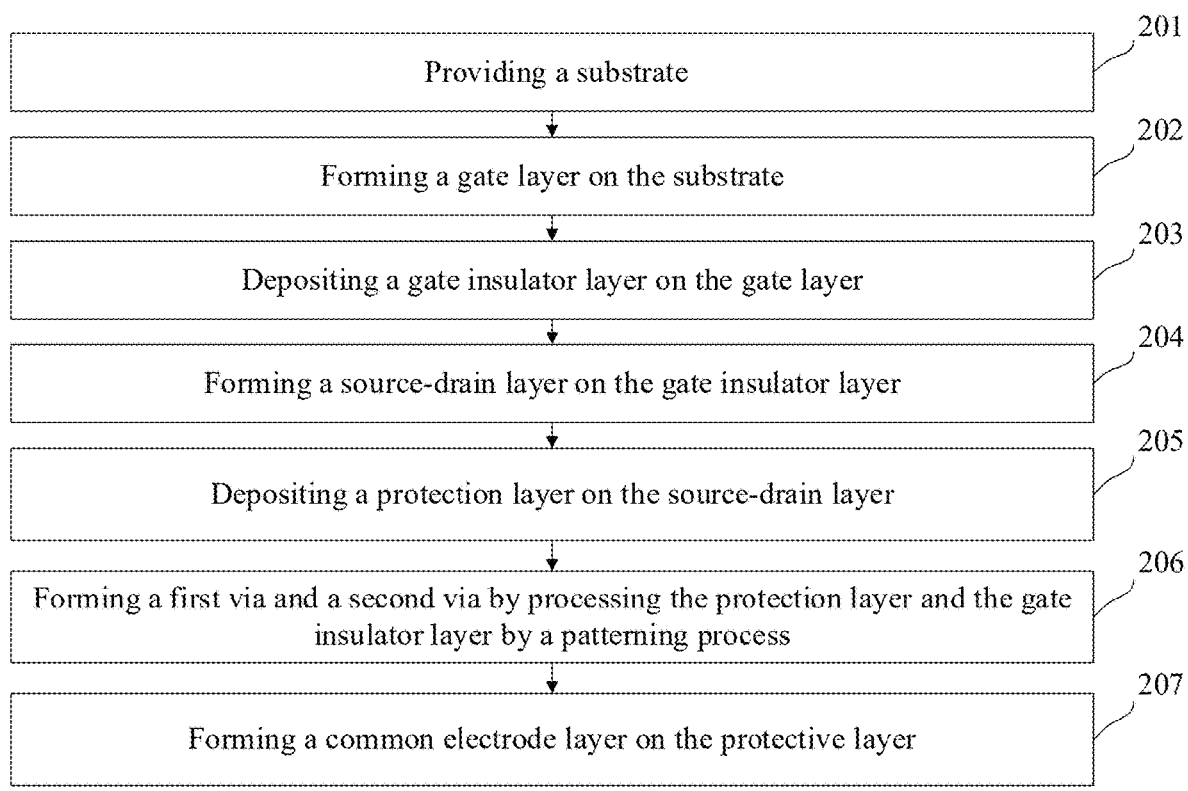
FIG. 11 is a flowchart of a method for manufacturing an array substrate according to some embodiments of the present disclosure.

FIG. 11 is a flowchart of a method for manufacturing an array substrate according to some embodiments of the present disclosure. Referring to FIG. 11, the method includes the following steps.

In 201, a substrate is provided.

In 202, a gate layer is formed on the substrate.

Forming the gate layer includes depositing a gate layer film and acquiring the gate layer by processing the gate layer film by a patterning process. The gate layer includes a second gate line and a gate.

In 203, a gate insulator layer is deposited on the gate layer.

In 204, a source-drain layer is formed on the gate insulator layer.

The source-drain layer includes a first gate line, a data line, a source, and a drain.

Forming the source-drain layer includes depositing a source-drain layer film and acquiring the source-drain layer by processing the source-drain layer film by a patterning process.

In 205, a protection layer is deposited on the source-drain layer.

In 206, a first via and a second via are formed by processing the protection layer and the gate insulator layer by a patterning process, wherein the first via is disposed in the protection layer, and the second via is disposed in the protection layer and the gate insulator layer.

In 207, a common electrode layer is formed on the protective layer.

Forming the common electrode layer includes depositing a common electrode layer film and acquiring the common electrode by processing the common electrode layer film by a patterning process.

The common electrode layer includes a gate connection line. The gate connection line is connected to the first gate line through the first via, and the gate connection line is connected to the second gate line through the second via.

In the embodiments, the second gate line is indirectly connected to the first gate line through the common electrode layer, such that the first via and the second via are formed by a one-time patterning process (MASK process), and thus, compared to the solution in which the first gate line and the second gate line are directly connected, the MASK process is saved and the overall process flow is improved.

In addition, the common electrode layer further includes a common electrode. The common electrode includes a hollow-out region, and the gate connection line is within the hollow-out region.

In the embodiments, by providing the common electrode around the vias, an electric field of the via indirectly connected the first gate line and the second gate line is shielded, and thus the display non-uniformity (mura) caused by the electric field of the via is eliminated.

In some embodiments, the method further includes:

forming a pixel electrode layer on the gate insulator layer, wherein the pixel electrode layer includes a pixel electrode.

Forming the pixel electrode layer includes depositing a pixel electrode layer film and acquiring the pixel electrode layer by processing the pixel electrode layer film by a patterning process.

In some embodiments, the method further includes forming an active layer on the gate insulator layer, wherein the active layer includes an active layer pattern between the gate insulator layer and the protection layer. Both the source and the drain are connected to the active layer pattern.

Forming the active layer includes depositing an active layer film and acquiring the active layer by processing the active layer film by a patterning process.

Figure 12:
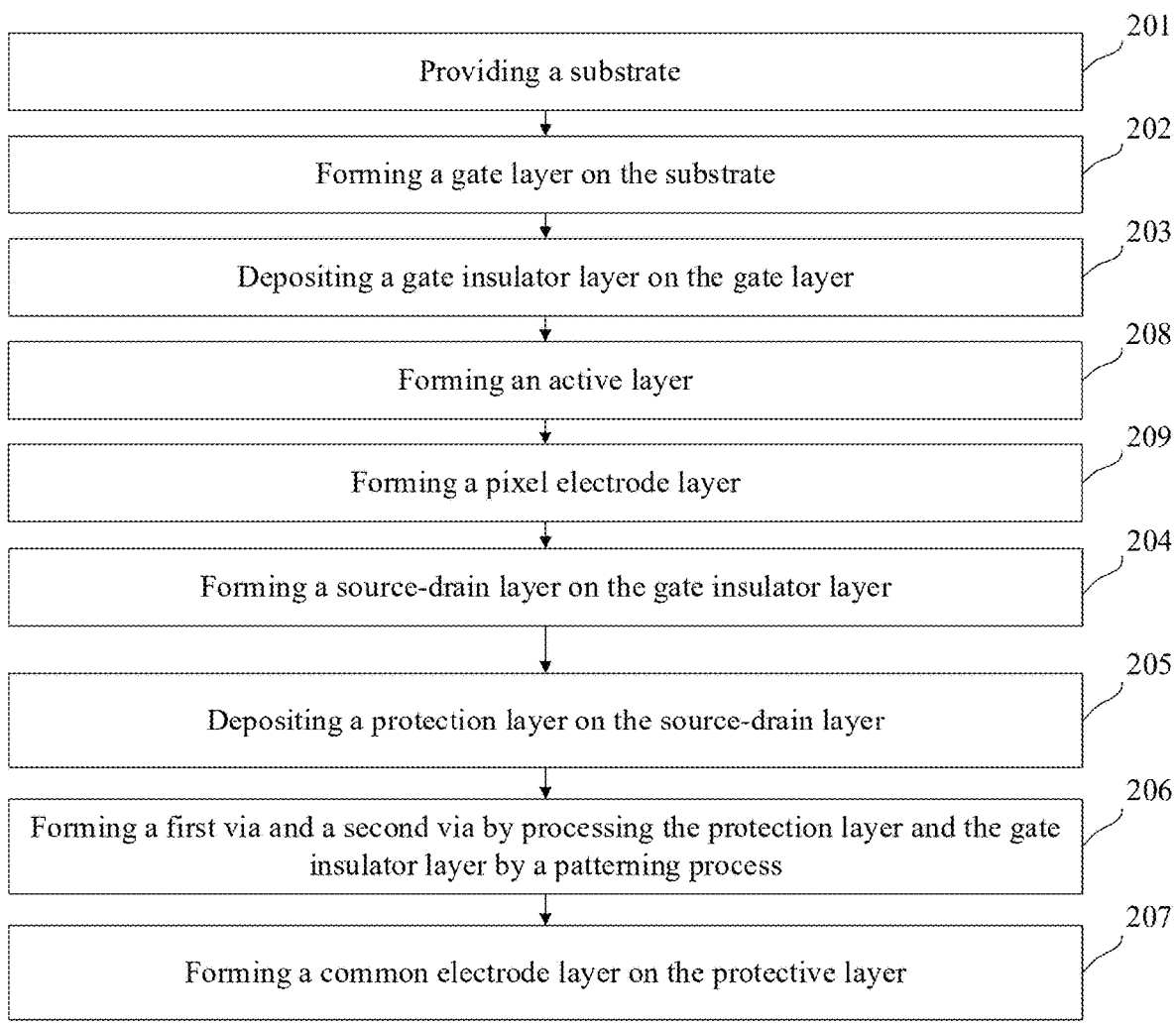
FIG. 12 is a flowchart of a method for manufacturing an array substrate according to some embodiments of the present disclosure.

In the case that the array substrate includes the active layer and the pixel electrode layer, a forming process thereof refers to FIG. 12, which further includes step 208 and step 209. In step 208, the active layer is formed, and in step 209, the pixel electrode layer is formed. Steps 208 and 209 are performed between steps 203 and 204.

According to the embodiments of the present disclosure, 6 patterning processes are used in forming the array substrate, which greatly simplifies the process flow compared to the 8 patterning processes required for forming the array substrate in the related art.

The active layer and the source-drain electrode are connected to each other through a via in a second insulator layer and a third insulator layer.

The substrate is a glass substrate. Both the gate layer and the source-drain layer are metal layers or indium tin oxide layers. The gate insulator layer, the second insulator layer, and the third insulator layer are one of the following: an insulator layer formed by one of silicon oxide, silicon nitride, or silicon oxynitride, or a stacked layer formed by at least two thereof. The active layer is a polysilicon layer or an amorphous silicon layer. The planarization layer is a resin layer, a planarization layer formed by one of silicon oxide, silicon nitride, or silicon oxynitride, or a stacked layer formed by at least two thereof. Both the common electrode layer and the pixel electrode layer are indium tin oxide electrode layers.

In some embodiments, the peripheral region further includes a connection region. The connection region is between the display region and the DPO region. The method further includes:

forming a plurality of connection lines in the connection region on the substrate, wherein the plurality of first gate lines are connected to the plurality of GOA units respectively by the plurality of connection lines.

In the embodiments, by providing the connection region and the connection lines, the plurality of GOA units on the DPO side are capable of being connected to the plurality of first gate lines, which are concentrated in this portion of the display region, in one-to-one correspondence.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. An array substrate, comprising a substrate; wherein
the substrate comprises a display region and a peripheral region surrounding the display region, the display region comprising a plurality of pixel regions arranged in arrays;
the array substrate further comprises a plurality of GOA units and a plurality of gate lines, wherein the plurality of GOA units are arranged along a first direction, the peripheral region comprises a data pad (DP) region and a data pad opposite (DPO) region that are arranged opposite to each other along a second direction on two sides of the display region, the plurality of GOA units are within the DPO region, the plurality of gate lines are within the display region, and the plurality of GOA units are electrically connected to the plurality of gate lines, the first direction being intersected with the second direction; and
in the display region, the array substrate further comprises a gate layer, a gate insulator layer, a source-drain layer, a protection layer, and a common electrode layer that are successively stacked on the substrate, the common electrode layer comprising a gate connection line,
wherein the plurality of gate lines comprise a plurality of first gate lines and a plurality of second gate lines, wherein extension directions of the plurality of first gate lines are consistent with the second direction, extension directions of the plurality of second gate lines are consistent with the first direction, and the plurality of second gate lines are connected to the plurality of GOA units respectively by the plurality of first gate lines; and
the plurality of first gate lines are disposed in the source-drain layer, the plurality of second gate lines are disposed in the gate layer, the plurality of first gate lines are connected to the gate connection line through a first via in the protection layer, and the plurality of second gate lines are connected to the gate connection line through a second via in the gate insulator layer and the protection layer.

2. The array substrate according to claim 1, wherein a number of the pixel regions in one row arranged along the first direction is greater than a number of the pixel regions in one column arranged along the second direction.

3. The array substrate according to claim 2, wherein the plurality of the first gate lines are within a middle section of the display region.

4. The array substrate according to claim 3, wherein one of the first gate lines is arranged in each column of the pixel regions in the middle section of the display region.

5. The array substrate according to claim 4, wherein the pixel region comprises a first sub-region, a second sub-region, and a third sub-region that are arranged along the first direction, wherein the first sub-region is a green sub-region, and the first gate line is between the second sub-region and the third sub-region, or the first gate line is within the second sub-region or the third sub-region.

6. The array substrate according to claim 1, wherein
the peripheral region further comprises a connection region between the display region and the DPO region; and
the array substrate further comprises a plurality of connection lines in the connection region, the plurality of first gate lines being connected to the plurality of GOA units respectively by the plurality of connection lines.

7. The array substrate according to claim 6, wherein at least a portion of the connection lines are straight lines.

8. The array substrate according to claim 6, wherein in the connection region, the array substrate further comprises a gate layer, a gate insulator layer, and a source-drain layer that are successively stacked on the substrate, and the plurality of connection lines comprise a plurality of first connection lines and a plurality of second connection lines; wherein
the plurality of first connection lines are disposed in the source-drain layer, the plurality of first connection lines are directly connected to an output terminal of the GOA unit at a position, proximal to the DPO region, of the connection region, and the plurality of first connection lines are directly connected to the plurality of first gate lines at a position, proximal to the display region, of the connection region; and
the plurality of second connection lines are disposed in the gate layer, the plurality of second connection lines are connected to the output terminal of the GOA unit through a via at the position, proximal to the DPO region, of the connection region, and the plurality of second connection lines are connected to the plurality of first gate lines through a via at the position, proximal to the display region, of the connection region.

9. The array substrate according to claim 6, wherein
in the connection region, the array substrate further comprises a gate layer, a gate insulator layer, and a source-drain layer that are successively stacked on the substrate; and
the plurality of connection lines are disposed in the source-drain layer, the plurality of connection lines are directly connected to an output terminal of the GOA unit at a position, proximal to the DPO region, of the connection region, and the plurality of connection lines are directly connected to the plurality of first gate lines at a position, proximal to the display region, of the connection region.

10. The array substrate according to claim 6, wherein
in the connection region, the array substrate further comprises a gate layer disposed on the substrate; and
the plurality of connection lines are disposed in the gate layer, the plurality of connection lines are connected to an output terminal of the GOA unit through a via at a position, proximal to the DPO region, of the connection region, and the plurality of connection lines are connected to the plurality of first gate lines through a via at a position, proximal to the display region, of the connection region.

11. The array substrate according to claim 1, wherein a number of the pixel regions in one row arranged along the first direction is greater than or equal to twice a number of the pixel regions in one column arranged along the second direction, a number of the first gate lines is equal to twice a number of the second gate lines, a number of the GOA units is greater than or equal to twice the number of the pixel regions in one column, each of the second gate lines is connected to two GOA units by two first gate lines, and the two GOA units connected to the same second gate line are arranged symmetrically with respect to a centerline, the centerline being a centerline of the substrate extending along the second direction.

12. The array substrate according to claim 1, wherein boundaries of adjacent GOA units in the plurality of GOA units are coincident, and the GOA units disposed at two ends are respectively disposed on or near two sides of the display region in the first direction.

13. A display panel, comprising: an array substrate;
wherein the array substrate comprises a substrate; wherein the substrate comprises a display region and a peripheral region surrounding the display region, the display region comprising a plurality of pixel regions arranged in arrays;
the array substrate further comprises a plurality of GOA units and a plurality of gate lines, wherein the plurality of GOA units are arranged along a first direction, the peripheral region comprises a data pad (DP) region and a data pad opposite (DPO) region that are arranged opposite to each other along a second direction on two sides of the display region, the plurality of GOA units are within the DPO region, the plurality of gate lines are within the display region, and the plurality of GOA units are electrically connected to the plurality of gate lines, the first direction being intersected with the second direction; and
in the display region, the array substrate further comprises a gate layer, a gate insulator layer, a source-drain layer, a protection layer, and a common electrode layer that are successively stacked on the substrate, the common electrode layer comprising a gate connection line,
wherein the plurality of gate lines comprise a plurality of first gate lines and a plurality of second gate lines, wherein extension directions of the plurality of first gate lines are consistent with the second direction, extension directions of the plurality of second gate lines are consistent with the first direction, and the plurality of second gate lines are connected to the plurality of GOA units respectively by the plurality of first gate lines; and
the plurality of first gate lines are disposed in the source-drain layer, the plurality of second gate lines are disposed in the gate layer, the plurality of first gate lines are connected to the gate connection line through a first via in the protection layer, and the plurality of second gate lines are connected to the gate connection line through a second via in the gate insulator layer and the protection layer.

14. A display device, comprising: the display panel as defined in claim 13.

15. A method for manufacturing an array substrate, comprising:
providing a substrate, wherein the substrate comprises a display region and a peripheral region surrounding the display region, the display region comprising a plurality of pixel regions arranged in arrays; and
forming a plurality of GOA units and a plurality of gate lines on the substrate, wherein the plurality of GOA units are arranged along a first direction, the peripheral region comprises a data pad (DP) region and a data pad opposite (DPO) region that are arranged opposite to each other along a second direction on two sides of the display region, the GOA unit is within the DPO region, the plurality of gate lines are within the display region, and the plurality of GOA units are electrically connected to the plurality of gate lines, the first direction being intersected with the second direction;
wherein the plurality of gate lines comprise a plurality of first gate lines and a plurality of second gate lines, wherein extension directions of the plurality of first gate lines are consistent with the second direction, extension directions of the plurality of second gate lines are consistent with the first direction, and the plurality of second gate lines are connected to the plurality of GOA units respectively by the plurality of first gate lines; and
forming the plurality of GOA units and the plurality of gate lines on the substrate comprises:
forming a gate layer on the substrate, wherein the gate layer comprises the plurality of second gate lines;
depositing a gate insulator layer on the gate layer;
forming a source-drain layer on the gate insulator layer, wherein the source-drain layer comprises the plurality of first gate lines;
depositing a protection layer on the source-drain layer;
forming a first via and a second via by processing the protection layer and the gate insulator layer by a patterning process, wherein the first via is disposed in the protection layer, and the second via is disposed in the protection layer and the gate insulator layer; and
forming a common electrode layer on the protection layer, wherein the common electrode layer comprises a gate connection line, the gate connection line being connected to the plurality of first gate lines through the first via and connected to the plurality of second gate lines through the second via.

16. The method according to claim 15, wherein the peripheral region further comprises a connection region between the display region and the DPO region; and
the method further comprises:
forming a plurality of connection lines on the substrate in the connection region, wherein the plurality of first gate lines are connected to the plurality of GOA units respectively by the plurality of the connection lines.

\* \* \* \* \*